US 7,357,331 B2

(12) United States Patent
Blossom (10) Patent No.: US 7,357,331 B2
(45) Date of Patent: *Apr. 15, 2008

(54) SELECTABLE MULTI-PURPOSE CARD

(75) Inventor: George Blossom, West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 11/558,947

(22) Filed: Nov. 13, 2006

(65) Prior Publication Data

US 2007/0063025 A1   Mar. 22, 2007

Related U.S. Application Data

(60) Continuation of application No. 11/011,683, filed on Dec. 15, 2004, now Pat. No. 7,191,952, which is a division of application No. 10/436,466, filed on May 13, 2003, now Pat. No. 7,163,153, which is a division of application No. 09/730,399, filed on Dec. 6, 2000, now Pat. No. 6,631,849.

(51) Int. Cl.
*G06K 19/06* (2006.01)

(52) U.S. Cl. .................... 235/492; 235/380
(58) Field of Classification Search ........... 235/380, 235/382, 487, 493
See application file for complete search history.

(56) References Cited

U.S. PATENT DOCUMENTS 3,532,543 A    10/1970   Nole et al.
3,546,022 A    12/1970   Busch et al.
3,634,669 A    1/1972    Soumas et al.
3,806,369 A    4/1974    Dey et al.
3,946,206 A    3/1976    Darjany
4,047,033 A    9/1977    Malmberg et al.
4,465,206 A    8/1984    Sorel et al.
4,523,297 A    6/1985    Ugon et al.

(Continued)

FOREIGN PATENT DOCUMENTS

CA    2293321    12/1998

(Continued)

OTHER PUBLICATIONS

U.S. Appl. No. 09/505,189, filed Feb. 16, 2000, Brake, Jr. et al.

(Continued)

*Primary Examiner*—Daniel StCyr
(74) *Attorney, Agent, or Firm*—Hunton & Williams LLP (57) ABSTRACT

A selectable, multi-purpose card comprising a plurality of features stored in memory means operatively mounted on the card and selection means for allowing a user to select a feature in a few simple steps, preferably in a single step. In one embodiment the card includes a plurality of magnetic strips positioned on the card in a manner to allow swiping each magnetic strip separately using conventional reading devices. Each magnetic strip activates a different feature of the card. In another embodiment the card includes a programmable magnetic strip, a plurality of features stored in memory means mounted on the card, a plurality of buttons or contacts, and means for programming the magnetic strip with a different card feature. The card may also include a thin, flexible display.

26 Claims, 4 Drawing Sheets

U.S. PATENT DOCUMENTS

| | | |
|---|---|---|
| 4,544,834 A | 10/1985 | Newport et al. |
| 4,545,838 A | 10/1985 | Minkus et al. |
| 4,582,985 A | 4/1986 | Lofberg |
| 4,614,861 A | 9/1986 | Pavlov |
| 4,634,845 A | 1/1987 | Hale et al. |
| 4,689,478 A | 8/1987 | Hale et al. |
| 4,700,055 A | 10/1987 | Kashkashian, Jr. |
| 4,746,787 A | 5/1988 | Suto et al. |
| 4,750,036 A | 6/1988 | Martinez |
| 4,750,119 A | 6/1988 | Cohen et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,825,052 A | 4/1989 | Ugon |
| 4,831,242 A | 5/1989 | Englehardt |
| 4,831,526 A | 5/1989 | Luchs |
| 4,833,048 A | 5/1989 | Dejonghe et al. |
| 4,837,422 A | 6/1989 | Dethloff et al. |
| 4,859,837 A | 8/1989 | Halpern |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,916,296 A | 4/1990 | Streck |
| 4,922,111 A | 5/1990 | Kuwano |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,455 A | 12/1990 | Young |
| 4,978,401 A | 12/1990 | Bonomi |
| 4,992,940 A | 2/1991 | Dworkin |
| 4,999,617 A | 3/1991 | Uemura et al. |
| 5,025,372 A | 6/1991 | Burton et al. |
| 5,025,373 A | 6/1991 | Keyser, Jr. |
| 5,047,614 A | 9/1991 | Bianco |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,146,068 A | 9/1992 | Ugawa et al. |
| 5,154,731 A | 10/1992 | Winger |
| 5,162,175 A | 11/1992 | Visco et al. |
| 5,168,151 A | 12/1992 | Nara |
| 5,173,589 A | 12/1992 | Diehl |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,227,614 A | 7/1993 | Danielson |
| 5,233,654 A | 8/1993 | Harvey |
| 5,241,161 A | 8/1993 | Zuta |
| 5,247,190 A | 9/1993 | Friend et al. |
| 5,249,044 A | 9/1993 | Von Kohorn |
| 5,252,815 A | 10/1993 | Pernet |
| 5,276,311 A | 1/1994 | Hartmut |
| 5,285,278 A | 2/1994 | Holman |
| 5,287,181 A | 2/1994 | Holman |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,317,137 A | 5/1994 | Wilkins |
| 5,321,240 A | 6/1994 | Takahira |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,340,969 A | 8/1994 | Cox |
| 5,349,633 A | 9/1994 | Katz |
| 5,350,906 A | 9/1994 | Brody et al. |
| 5,359,183 A | 10/1994 | Skodlar |
| 5,361,062 A | 11/1994 | Weiss et al. |
| 5,365,575 A | 11/1994 | Katz |
| 5,383,113 A | 1/1995 | Knight |
| 5,396,650 A | 3/1995 | Terauchi |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,192 A | 5/1995 | Hoss |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Henry |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,488,571 A | 1/1996 | Jacobs |
| 5,500,514 A | 3/1996 | Veeneman et al. |
| 5,504,664 A | 4/1996 | Osterna |
| 5,506,394 A | 4/1996 | Piesko |
| 5,508,731 A | 4/1996 | Von Kohom |
| 5,510,828 A | 4/1996 | Lutterbach |
| 5,511,114 A | 4/1996 | Stimson et al. |
| 5,512,654 A | 4/1996 | Holmes et al. |
| 5,513,102 A | 4/1996 | Auriemma |
| 5,516,598 A | 5/1996 | Visco et al. |
| 5,521,363 A | 5/1996 | Tannenbaum |
| 5,523,179 A | 6/1996 | Chu |
| 5,523,794 A | 6/1996 | Mankovitz |
| 5,530,232 A | 6/1996 | Taylor |
| 5,530,235 A | 6/1996 | Stefik et al. |
| 5,535,147 A | 7/1996 | Jacobs |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,559,313 A | 9/1996 | Claus et al. |
| 5,563,948 A | 10/1996 | Diehl |
| 5,568,441 A | 10/1996 | Sanemitsu |
| 5,572,004 A | 11/1996 | Raimann |
| 5,577,109 A | 11/1996 | Stimson et al. |
| 5,578,808 A | 11/1996 | Taylor |
| 5,581,064 A | 12/1996 | Riley et al. |
| 5,582,623 A | 12/1996 | Chu |
| 5,585,787 A | 12/1996 | Wallerstein |
| 5,590,038 A | 12/1996 | Pitroda |
| 5,592,560 A | 1/1997 | Deaton et al. |

| | | | | | | |
|---|---|---|---|---|---|---|
| 5,594,493 A | 1/1997 | Nemirofsky | | 5,777,305 A | 7/1998 | Smith et al. |
| 5,604,542 A | 2/1997 | Dedrick | | 5,777,306 A | 7/1998 | Masuda |
| 5,608,785 A | 3/1997 | Kasday | | 5,777,903 A | 7/1998 | Piosenka et al. |
| 5,612,868 A | 3/1997 | Off | | 5,778,067 A | 7/1998 | Jones et al. |
| 5,613,095 A | 3/1997 | Moss et al. | | 5,787,156 A | 7/1998 | Katz |
| 5,621,787 A | 4/1997 | McKoy et al. | | 5,787,404 A | 7/1998 | Fernandez-Holmann |
| 5,621,812 A | 4/1997 | Deaton et al. | | 5,789,732 A | 8/1998 | McMahon |
| 5,629,977 A | 5/1997 | Fonseca | | 5,789,733 A | 8/1998 | Jachimowicz et al. |
| 5,637,845 A | 6/1997 | Kolls | | 5,794,207 A | 8/1998 | Walker |
| 5,638,457 A | 6/1997 | Deaton et al. | | 5,799,087 A | 8/1998 | Rosen |
| 5,642,279 A | 6/1997 | Stone | | 5,802,176 A | 9/1998 | Audebert |
| 5,642,485 A | 6/1997 | Deaton et al. | | 5,804,806 A | 9/1998 | Haddad |
| 5,644,723 A | 7/1997 | Deaton et al. | | 5,805,719 A | 9/1998 | Pare et al. |
| 5,644,727 A | 7/1997 | Atkins | | 5,806,042 A | 9/1998 | Kelly et al. |
| 5,649,114 A | 7/1997 | Deaton et al. | | 5,806,044 A | 9/1998 | Powell |
| 5,649,117 A | 7/1997 | Landry | | 5,806,045 A | 9/1998 | Biorge |
| 5,649,118 A | 7/1997 | Carlisle et al. | | 5,807,627 A | 9/1998 | Friend et al. |
| 5,652,602 A | 7/1997 | Fishman | | 5,809,478 A | 9/1998 | Greco |
| 5,653,914 A | 8/1997 | Holmes et al. | | 5,815,127 A | 9/1998 | Jacobs |
| 5,659,741 A | 8/1997 | Eberhardt | | 5,815,657 A | 9/1998 | Williams et al. |
| 5,663,766 A | 9/1997 | Sizer, II | | 5,815,658 A | 9/1998 | Kuriyama |
| 5,664,110 A | 9/1997 | Green et al. | | 5,819,234 A | 10/1998 | Slavin et al. |
| 5,664,157 A | 9/1997 | Takahira et al. | | 5,819,237 A | 10/1998 | Garman |
| 5,665,953 A | 9/1997 | Mazzamuto | | 5,826,243 A | 10/1998 | Musmanno et al. |
| 5,672,678 A | 9/1997 | Holmes et al. | | 5,832,457 A | 11/1998 | O'Brien |
| 5,675,607 A | 10/1997 | Alesio et al. | | 5,832,488 A | 11/1998 | Eberhardt |
| 5,675,662 A | 10/1997 | Deaton et al. | | 5,835,061 A | 11/1998 | Stewart |
| 5,677,955 A | 10/1997 | Doggett et al. | | 5,835,576 A | 11/1998 | Katz |
| 5,684,291 A | 11/1997 | Taskett | | 5,839,113 A | 11/1998 | Federau et al. |
| 5,687,322 A | 11/1997 | Deaton et al. | | 5,845,259 A | 12/1998 | West et al. |
| 5,689,100 A | 11/1997 | Carrithers et al. | | 5,845,260 A | 12/1998 | Nakano et al. |
| 5,689,650 A | 11/1997 | McClelland et al. | | 5,847,372 A | 12/1998 | Kreft |
| 5,690,412 A | 11/1997 | Sheldon | | 5,852,811 A | 12/1998 | Atkins |
| 5,692,132 A | 11/1997 | Hogan | | 5,852,812 A | 12/1998 | Reeder |
| 5,696,907 A | 12/1997 | Tom | | 5,854,595 A | 12/1998 | Williams |
| 5,699,528 A | 12/1997 | Hogan | | 5,857,079 A | 1/1999 | Claus et al. |
| 5,703,344 A | 12/1997 | Bezy et al. | | 5,857,175 A | 1/1999 | Day |
| 5,704,046 A | 12/1997 | Hogan | | 5,857,709 A | 1/1999 | Chock |
| 5,705,798 A | 1/1998 | Tarbox | | 5,859,419 A | 1/1999 | Wynn |
| 5,708,422 A | 1/1998 | Blonder et al. | | 5,864,609 A | 1/1999 | Cross et al. |
| 5,710,458 A | 1/1998 | Iwasaki | | 5,864,828 A | 1/1999 | Atkins |
| 5,710,886 A | 1/1998 | Christensen et al. | | 5,864,830 A | 1/1999 | Armetta et al. |
| 5,710,887 A | 1/1998 | Chelliah | | RE36,116 E | 2/1999 | McCarthy |
| 5,710,889 A | 1/1998 | Clark et al. | | 5,870,155 A | 2/1999 | Erlin |
| 5,715,399 A | 2/1998 | Bezos | | 5,870,718 A | 2/1999 | Spector |
| 5,717,925 A | 2/1998 | Harper et al. | | 5,870,721 A | 2/1999 | Norris |
| 5,721,768 A | 2/1998 | Stimson et al. | | 5,875,437 A | 2/1999 | Atkins |
| 5,721,781 A | 2/1998 | Deo et al. | | 5,880,769 A | 3/1999 | Nemirofsky |
| 5,726,884 A | 3/1998 | Sturgeon et al. | | 5,883,377 A | 3/1999 | Chapin, Jr. |
| 5,727,153 A | 3/1998 | Powell | | 5,883,810 A | 3/1999 | Franklin et al. |
| 5,728,998 A | 3/1998 | Novis et al. | | 5,884,271 A | 3/1999 | Pitroda |
| 5,729,693 A | 3/1998 | Holda-Fleck | | 5,884,278 A | 3/1999 | Powell |
| 5,734,154 A | 3/1998 | Jachimowicz et al. | | 5,884,285 A | 3/1999 | Atkins |
| 5,734,838 A | 3/1998 | Robinson | | 5,887,065 A | 3/1999 | Audebert |
| 5,736,727 A | 4/1998 | Nakata | | 5,887,271 A | 3/1999 | Powell |
| 5,736,728 A | 4/1998 | Matsubara | | 5,890,135 A | 3/1999 | Powell |
| 5,737,421 A | 4/1998 | Audebert | | 5,890,138 A | 3/1999 | Godin et al. |
| 5,740,549 A | 4/1998 | Reilly et al. | | 5,890,140 A | 3/1999 | Clark et al. |
| 5,742,775 A | 4/1998 | King | | H1794 H | 4/1999 | Claus |
| 5,744,789 A | 4/1998 | Kashi | | 5,897,620 A | 4/1999 | Walker et al. |
| 5,745,049 A | 4/1998 | Akiyama et al. | | 5,905,246 A | 5/1999 | Fajkowski |
| 5,745,706 A | 4/1998 | Wolfberg et al. | | 5,907,350 A | 5/1999 | Nemirofsky |
| 5,749,075 A | 5/1998 | Toader et al. | | 5,911,135 A | 6/1999 | Atkins |
| 5,751,953 A | 5/1998 | Sheils | | 5,911,136 A | 6/1999 | Atkins |
| 5,760,381 A | 6/1998 | Stich et al. | | 5,914,472 A | 6/1999 | Foladare et al. |
| 5,761,624 A | 6/1998 | Mooney | | 5,920,629 A | 7/1999 | Rosen |
| 5,763,862 A | 6/1998 | Jachimowicz | | 5,920,844 A | 7/1999 | Hotta et al. |
| 5,765,138 A | 6/1998 | Aycock et al. | | 5,920,847 A | 7/1999 | Kolling et al. |
| 5,765,141 A | 6/1998 | Spector | | 5,923,734 A | 7/1999 | Taskett |
| 5,767,896 A | 6/1998 | Nemirofsky | | 5,926,800 A | 7/1999 | Baronowski et al. |
| 5,770,843 A | 6/1998 | Rose et al. | | 5,930,217 A | 7/1999 | Kayanuma |
| 5,770,849 A | 6/1998 | Novis et al. | | 5,931,764 A | 8/1999 | Freeman et al. |
| 5,774,870 A | 6/1998 | Storey | | 5,933,817 A | 8/1999 | Hucal |

| | | | | | |
|---|---|---|---|---|---|
| 5,937,068 A | 8/1999 | Audebert | 6,105,011 A | 8/2000 | Morrison, Jr. |
| 5,940,811 A | 8/1999 | Norris | 6,105,865 A | 8/2000 | Hardesty |
| 5,952,639 A | 9/1999 | Ohki | 6,109,525 A | 8/2000 | Blomqvist et al. |
| 5,952,641 A | 9/1999 | Korshun | 6,112,191 A | 8/2000 | Burke |
| 5,953,423 A | 9/1999 | Rosen | D431,039 S | 9/2000 | Wilson |
| 5,953,710 A | 9/1999 | Fleming | D431,252 S | 9/2000 | Wilson |
| 5,955,961 A | 9/1999 | Wallerstein | 6,115,458 A | 9/2000 | Taskett |
| 5,956,695 A | 9/1999 | Carrithers et al. | 6,119,097 A | 9/2000 | Ibarra |
| 5,963,648 A | 10/1999 | Rosen | 6,119,932 A | 9/2000 | Maloney et al. |
| 5,970,479 A | 10/1999 | Shepherd | 6,122,623 A | 9/2000 | Garman |
| 5,970,480 A | 10/1999 | Kalina | D431,573 S | 10/2000 | Wilson |
| 5,974,399 A | 10/1999 | Giuliani et al. | D432,141 S | 10/2000 | Wilson |
| RE36,365 E | 11/1999 | Levine et al. | D432,548 S | 10/2000 | Wilson |
| 5,984,180 A | 11/1999 | Albrecht | D432,552 S | 10/2000 | Wilson |
| 5,984,191 A | 11/1999 | Chapin, Jr. | D433,031 S | 10/2000 | Wilson |
| 5,987,434 A | 11/1999 | Libman | D433,032 S | 10/2000 | Wilson |
| 5,988,509 A | 11/1999 | Taskett | D433,033 S | 10/2000 | Wilson |
| 5,991,413 A | 11/1999 | Arditti et al. | D433,034 S | 10/2000 | Wilson |
| 5,991,743 A | 11/1999 | Irving et al. | D433,035 S | 10/2000 | Wilson |
| 5,991,748 A | 11/1999 | Taskett | D433,036 S | 10/2000 | Wilson |
| 5,991,750 A | 11/1999 | Watson | D433,037 S | 10/2000 | Wilson |
| 5,995,372 A | 11/1999 | Asakura | D433,059 S | 10/2000 | Okumura et al. |
| 5,999,596 A | 12/1999 | Walker et al. | 6,128,598 A | 10/2000 | Walker et al. |
| 6,000,608 A | 12/1999 | Dorf | 6,128,599 A | 10/2000 | Walker et al. |
| 6,000,832 A | 12/1999 | Franklin et al. | 6,129,274 A | 10/2000 | Suzuki |
| 6,002,383 A | 12/1999 | Shimada | 6,134,536 A | 10/2000 | Shepherd |
| 6,003,762 A | 12/1999 | Hayashida | 6,138,917 A | 10/2000 | Chapin, Jr. |
| 6,003,770 A | 12/1999 | Schilling | D433,420 S | 11/2000 | Wilson |
| 6,004,681 A | 12/1999 | Epstein et al. | D433,421 S | 11/2000 | Wilson |
| 6,005,183 A | 12/1999 | Akai et al. | D433,422 S | 11/2000 | Wilson |
| 6,006,988 A | 12/1999 | Behrmann et al. | D433,423 S | 11/2000 | Wilson |
| 6,009,415 A | 12/1999 | Shurling et al. | D433,424 S | 11/2000 | Wilson |
| 6,014,636 A | 1/2000 | Reeder | D434,041 S | 11/2000 | Burke |
| 6,014,638 A | 1/2000 | Burge et al. | 6,145,741 A | 11/2000 | Wisdom et al. |
| 6,014,645 A | 1/2000 | Cunningham | 6,148,297 A | 11/2000 | Swor et al. |
| 6,014,749 A | 1/2000 | Gloor et al. | 6,161,096 A | 12/2000 | Bell |
| 6,016,482 A | 1/2000 | Molinari et al. | 6,163,770 A | 12/2000 | Gamble et al. |
| 6,016,954 A | 1/2000 | Abe et al. | 6,164,533 A | 12/2000 | Barton |
| 6,019,284 A | 2/2000 | Freeman et al. | 6,167,385 A | 12/2000 | Hartley-Urquhart |
| 6,026,370 A | 2/2000 | Jermyn | 6,169,975 B1 | 1/2001 | White et al. |
| 6,027,028 A | 2/2000 | Pieterse et al. | 6,170,745 B1 | 1/2001 | Schilling |
| 6,029,139 A | 2/2000 | Cunningham et al. | 6,173,267 B1 | 1/2001 | Cairns |
| 6,029,890 A | 2/2000 | Austin | 6,182,048 B1 | 1/2001 | Osborn et al. |
| 6,032,134 A | 2/2000 | Weissman | D437,882 S | 2/2001 | Creighton |
| 6,032,136 A | 2/2000 | Brake, Jr. | 6,182,894 B1 | 2/2001 | Hackett et al. |
| 6,036,099 A | 3/2000 | Leighton | 6,186,793 B1 | 2/2001 | Brubaker |
| 6,038,292 A | 3/2000 | Thomas | 6,189,787 B1 | 2/2001 | Dorf |
| 6,038,552 A | 3/2000 | Fleischl et al. | 6,192,113 B1 | 2/2001 | Lorsch |
| 6,041,315 A | 3/2000 | Pollin | 6,195,644 B1 | 2/2001 | Bowie |
| 6,045,042 A | 4/2000 | Ohno | 6,202,053 B1 | 3/2001 | Christiansen et al. |
| 6,047,067 A | 4/2000 | Rosen | RE37,122 E | 4/2001 | Levine et al. |
| 6,047,268 A | 4/2000 | Bartoli et al. | 6,223,143 B1 | 4/2001 | Weinstock et al. |
| 6,049,463 A | 4/2000 | O'Malley et al. | 6,227,447 B1 | 5/2001 | Campisano |
| 6,049,773 A | 4/2000 | McCormack et al. | 6,243,688 B1 | 6/2001 | Kalina |
| 6,049,782 A | 4/2000 | Gottesman et al. | 6,263,316 B1 | 7/2001 | Khan et al. |
| 6,058,378 A | 5/2000 | Clark et al. | 6,265,977 B1 | 7/2001 | Vega et al. |
| 6,064,985 A | 5/2000 | Anderson | 6,278,981 B1 | 8/2001 | Dembo et al. |
| 6,065,675 A | 5/2000 | Teicher | 6,295,522 B1 | 9/2001 | Boesch |
| 6,068,183 A | 5/2000 | Freeman et al. | 6,298,336 B1 | 10/2001 | Davis et al. |
| 6,070,067 A | 5/2000 | Nguyen et al. | 6,308,268 B1 | 10/2001 | Audebert |
| 6,070,147 A | 5/2000 | Harms et al. | 6,336,099 B1 | 1/2002 | Barnett et al. |
| 6,070,153 A | 5/2000 | Simpson | 6,338,048 B1 | 1/2002 | Mori |
| 6,076,068 A | 6/2000 | DeLapa et al. | 6,341,724 B2 | 1/2002 | Campisano |
| 6,076,072 A | 6/2000 | Libman | 6,343,743 B1 | 2/2002 | Lamla |
| 6,078,888 A | 6/2000 | Johnson, Jr. | 6,345,261 B1 | 2/2002 | Feldelson |
| 6,078,891 A | 6/2000 | Riordan et al. | 6,345,766 B1 | 2/2002 | Taskett et al. |
| 6,087,954 A | 7/2000 | McSpadden et al. | 6,349,291 B1 | 2/2002 | Varma |
| 6,089,284 A | 7/2000 | Kaehler et al. | 6,360,954 B1 | 3/2002 | Barnardo |
| 6,091,817 A | 7/2000 | Bertina et al. | 6,366,220 B1 | 4/2002 | Elliott |
| 6,092,056 A | 7/2000 | Tull, Jr. et al. | 6,373,969 B1 | 4/2002 | Adler |
| 6,095,412 A | 8/2000 | Bertina et al. | 6,377,669 B1 | 4/2002 | Walker et al. |
| 6,095,416 A | 8/2000 | Grant et al. | 6,385,591 B1 | 5/2002 | Mankoff |
| 6,098,053 A | 8/2000 | Slater | 6,386,444 B1 | 5/2002 | Sullivan |

| | | |
|---|---|---|
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,557,750 B1 | 5/2003 | Druse et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 * | 10/2003 | Blossom .................... 235/492 |
| 6,641,049 B2 | 11/2003 | Luu |
| 6,641,050 B2 | 11/2003 | Kelley et al. |
| 6,675,127 B2 | 1/2004 | LaBlanc et al. |
| 6,687,222 B1 | 2/2004 | Mittal et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,757,710 B2 | 6/2004 | Reed |
| 6,802,008 B1 | 10/2004 | Ikefuji et al. |
| 6,805,287 B2 | 10/2004 | Bishop |
| 6,857,566 B2 | 2/2005 | Wankmueller |
| 6,865,547 B1 | 3/2005 | Brake, Jr. et al. |
| 6,868,426 B1 | 3/2005 | Mankoff |
| 6,876,971 B1 | 4/2005 | Burke |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,089,503 B1 | 8/2006 | Bloomquist et al. |
| 7,104,443 B1 | 9/2006 | Paul et al. |
| 7,163,153 B2 * | 1/2007 | Blossom .................... 235/492 |
| 7,165,049 B2 | 1/2007 | Slater |
| 7,191,952 B2 * | 3/2007 | Blossom .................... 235/492 |
| 2001/0011227 A1 | 8/2001 | Ashery et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2002/0194081 A1 | 12/2002 | Perkowski |
| 2003/0004828 A1 | 1/2003 | Epstein |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake, Jr. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2003/0225623 A1 | 12/2003 | Wankmueller |
| 2004/0024672 A1 | 2/2004 | Brake, Jr. |
| 2004/0030626 A1 | 2/2004 | Libman |
| 2004/0039588 A1 | 2/2004 | Libman |
| 2004/0049451 A1 | 3/2004 | Barardi |
| 2004/0059952 A1 | 3/2004 | Newport et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0121512 A1 | 6/2005 | Wankmueller |
| 2005/0127164 A1 | 6/2005 | Wankmueller |
| 2005/0171898 A1 | 8/2005 | Bishop et al. |
| 2005/0171905 A1 | 8/2005 | Wankmueller |
| 2006/0047589 A1 | 3/2006 | Grau |

FOREIGN PATENT DOCUMENTS

| | | | |
|---|---|---|---|
| EP | 0843292 | A2 | 5/1998 |
| EP | 0855659 | | 7/1998 |
| EP | 959440 | | 11/1999 |
| GB | 2275654 | A | 9/1994 |
| GB | 2376787 | | 12/2002 |
| GB | 2377071 | | 12/2002 |
| GB | 2377314 | | 1/2003 |
| WO | WO 94/29112 | | 12/1994 |
| WO | WO 97/41673 | | 11/1997 |
| WO | WO 98/59307 | | 12/1998 |
| WO | WO 99/05633 | | 2/1999 |
| WO | WO 01/18699 | | 3/2001 |
| WO | WO 01/69347 | | 9/2001 |
| WO | WO 01/69347 | A2 | 9/2001 |
| WO | WO 01/69347 | A3 | 9/2001 |

WO    WO 2005/043277 A3    5/2005

OTHER PUBLICATIONS

EPPMT, A Player Goes After Big Bucks in Cyberspace, American Banker, May 5, 1995.
Sotto, An RFID Code of Conduct, RFID Journal, May 30, 2005.
Brehl, Banks issue cash-card pledge, The Toronto Star, Oct. 9, 1997, 1 page.
BS12000 Files Patent Application for Optical Bank Card, Press Release, BS12000 Web, Apr. 27, 2004.
Card Flash, Daily Payment Card News, CardWeb.com, Aug. 10, 2004.
Rosen, Cash Just Isn't Flexible Enough: Shops of the Future Will Only Take Cards, Daily Express: Technology Section, Feb. 10, 1995.
Hesseldahl, China Goes Smartcard Crazy, Forbes.com, Jun. 12, 2001.
Schwartz, Digital Cash Payoff.
Electronic Purse, SCIA (Smart Card Industry Association), About Smart Cards, printed Feb. 23, 2001, www.scia.org, 1 page.
Sanchez-Klein, Electronic purse alliance planned, Computerworld, Jul. 29, 1998, printed Feb. 23, 2001, 2 pages.
Electronic purse can free you from ATM drag, Business Times, www.btimes.co.za, printed Feb. 23, 2001, 1 page.
Electronic purse card to be launched tomorrow, News Clippings, New Straits Times, Sep. 18, 1999, printed Feb. 23, 2001, 3 pages.
E-Z Pass, Web page, http://www.ezpass.com/whatis.html, Nov. 12, 2001.
E-Z Pass, Web page, http://www.ezpass.com/frameMain.htm, Nov. 12, 2001.
E-Z Pass, Web page, http://www.ezpass.com/Disc_portNew York. htm, Nov. 12, 2001.
E-Z Pass, Web page, http://www.ezpass.com/Disc_ny_annual.htm, Nov. 12, 2001.
Frequently asked questions, ECARD, www.ergecard.com, printed Feb. 23, 2001, 7 pages.
Machilis, Have it the 'smart' way: Burger King program drives smart-card use, Computerworld, printed Feb. 23, 2001, 1 page.
Nokia Announces the World's First NFC Enabled Mobile Product for Contactless Payment and Ticketing, http://www.prnewswire.com, Feb. 9, 2005.
Proton world and Europay to co-operate in creation of new CEPS-compliant E-purse application, Press Release, printed Feb. 23, 2001, Waterloo, Belgium, Jun. 28, 1999, 2 pages.
Purse application for cross border use in euro, CORDIS, www.cordis.lu, PACE IST-1999-11531 PACE, printed Feb. 23, 2001, 3 pages.
RFID Tags, Contactless Smart Card Technology and Electronic Passports: Frequently Asked Questions, www.smartcardalliance.org/alliance_activities/rfd_FAQ.cfm, Feb. 17, 2005.
RFID Tags, Contactless Smart Card Technology: Comparing and Constrasting Applications and Capabilities. www.smartcardalliance.org/alliance_activities/rfdvscontactless.cfm, Feb. 17, 2005.
Dvorak, Smartcards Get Smarter, Forbes.com, Jun. 1, 2001.
Hesseldahl, Stock Focus: Smartcard Companies, Forbes.com, Jun. 18, 2001.
Load cash on to your e-purse card, Supported Currencies and Schemes, SmartAxis, printed 0/23/2001, www.smartaxis.co.uk, 9 pages.
The Electronic Purse Reaches the Car Park, printed 0/23/2001, 2 pages.
Stuber, The electronic purse: An overview of recent developments and issues, Bank of Canada, Technical Report No. 74, Jan. 1996, printed 0/23/2001, www.bankofcanada.ca, 2 pages.
Transponders: Cash In A Flash, Forbes.com, Jul. 31, 2001.
SK100 Smart Card Electronic Purse Balance Reader, Feb. 23, 2001, 1 page.
Smart card for loyalty and e-purse applications eclipses capability of conventional mag-stripe cards, Press Release, Apr. 21, 1997, printed Feb. 23, 2001, www.1.slb.com.
Gilhooly, Smart Cards Smart Move?, Computerworld, May 21, 2001.
Hesseldahl, U.S. Getting Wise To Smart Cards, Forbes.com, May 25, 2000.
ICL, Understanding the benefits: Smartcity offers a number of important benefits to both the card issuers and the customers, printed Feb. 27, 2001, www.icl.com, 2 pages.
Visa first to launch electronic purse load via GSM mobile phone, Johannesburg, Apr. 7, 1999, printed Feb. 23, 2001, www.cellular.co, 4 pages.
Hansell, Visa to unveil electronic purse cards, New York Times, printed Feb. 23, 2001, 2 pages.
Visa, MBNA and De La Rue Launch Multi-Function Smart Card Program, PR Newswire, Jul. 6, 1998.
Machlis et al., Will smart cards replace ATMs?, Computerworld, printed Feb. 23, 2001, 3 pages.
Brown, E. and Baumgartner J., Purchasing Card Magic; Eli Lily Finds Accounts Payable Flying High with Plastic, Corporate Cashflow, vol. 15, No. 12, p. 2-3, Nov. 1994.
Flickenscher, L., Amex Prepaid Offering is Latest Card for Films Rewarding Employees, American Banker, vol. 161, No. 151, p. 1-2 (Aug. 1996).
Welcome to SwiftGift, Gift Card Promotion web page, www.swiftgiftcard.com, p. 2-12, (Dec. 1998).
International Preliminary Examination Report dated Oct. 28, 2002 for PCT/US01/03587, Slater, filed Feb. 5, 2001.
International Search Report dated Apr. 27, 2001 forPCT/US01/03587, Slater, filed Feb. 5, 2001.
Here's the calling convenience you asked for: 1-800-call-AT&T . . . For All Calls,Appendix A: For Card Carriers, AT&T Universal Card with $50 in free AT&T calls; 1800 call ATT; 7 pages.
Lisa Fickenscher, "Amex prepaid offering is latest card for firms regarding employees", American Banker, vol. 161, No. 151, p. 11, Aug. 8, 1996, (American Express Co.'s employee incentive; Inventive Funds card); (Product Announcement), 2 pages.
"Associates First Capitol Corporation", Hoover's Inc., The Industry Standard: The Newsmagazine of the Internet Economy, thestandard.net/companies/company-display, Apr. 6, 1999 "How Many Risk-Free Issues Do You Want," Irving, Texas 75062, 2 pages.
Debit Card News, vol. 2, Issue 2, "Boatman's floats stored value into the employee incentive waters", Jul. 16, 1996, printed Jul. 27, 1999 @3:46pm; 2 3 pages.
Mickey Meece, "Boatman's prepaid cards for worker-incentive firm", American Banker, Jul. 2, 1996, p. 12.
CardEx Incentives, Apr. 6, 1999, www.cardexco.com, About CardEx; www.cardex.com, 14 pages.
"Cards on the Internet—Advertising on a $3 Bill"; Gerry Vandenengel; pp. 46-48.
"Cash Card Creator Looking Beyond Mondex"; Jeffrey Kutler; Feb. 9, 1995; 1 page.
Cash, Check, Charge—what's next?; David Bank, San Jose Mercury News; Seattle Times Mar. 6, 1995; 4 pages.
Nick Rosen, Cash Just Isn't Flexible Enough: Shops of the Future Will Only Take Cards, Daily Express: Technology Section, Feb. 10, 1995, 1 page.
Beth Piskora, Debit Cards Seen Poised for New Markets, American Banker, pp. 16, Mar. 7, 1995, 1 page.
Card News, vol. 6, No. 25, "D.C. Area Safeway stores look for increase in sales volume and revenue with cards", Dec. 1991, by Phillips Publishing, Inc.; Dec. 30, 1991; vol. 6, No. 25 ISSN 08494-0797; Copyright © 2000 Dow Jones & Company, Inc..All Rights Reserved; 4 pages.
"Last month, Verifone Inc. and Rite-Aid announced the introduction . . . "; printed Jul. 27, 1999 @3:51pm; 3 pages.
"The Evolution of a New Consumerism", Chain Store Age, vol. 73, pp. 8-9, Jun. 1997, H.W. Wilson Record No. BWBA97056650, 3 pages.
First USA—Activate today and get One Hour Free calling cards calls, call 1.800.555.2535; 6 pages.
First USA—Call 1(800) 355-2453 to Receive One Free Hour of Domestic Long Distance Calling (No strings attached.); 6 pages.
"Clutter Busters" Tracy Grant; "Present Policy"; T.G.; "The Gift of Credit"; Stephanie Stoughton; 1 page.
Incentive Firms Find Debit Cards a Rewarding Experience; Debit Card News, v 3, n 11, p. 1>>; Nov. 28, 1997; 3 pages.

"Key Bank Holiday Offer"; www.key.com/swiftgift/home.html; printed Apr. 5, 1999 @ 5:22pm; 14 pages.

"Microsoft, Visa to Jointly Develop PC Electronic-Shopping Software"; Don Clark, Staff Report, Wall Street Journal; 119/94; 3 pages.

Introducing SpendingMoney(TM), Armetta: Marketing & Design Product Concept Report, Oct. 9, 1996, Presented to First USA; Oct. 9, 1996; 15 pages.

Chain Store Age Executive with Shopping Center Age, "More retailers turn to co-branding", Feb. 1, 1995, vol. 71, No. 2, ISSN 0193-1199; Copyright © 2000 Dow Jones & Company, Inc. All Rights Reserved; 3 pages.

"Our Cards" printed Apr. 6, 1999 @ 11:31:33am; 7 pages.

Spurgin, "Sopininmon! or What's happening in the retail credit card environment", Credit World Journal, Apr. 1997, Ralph E. Spurgin, Copyright UMI Company 1997. All Rights Reserved. Copyright International Credit Association Mar./Apr. 1997; Mar 1, 1997; vol. 85, No. 4; Copyright © 2000 Dow Jones & Company, Inc. All Rights Reserved; 7 pages.

Credit Card News, "A store card issuer looks for lift from electronic gift certificates", Feb. 1, 1995, 2 pages.

Jeffery M. Lacker, "Stored Value Cards: Costly Private Substitutions for Government Currency", Economic Quarterly, 1996, 17 pages, v82, n3, p. 1(25).

Lucy Lzarony, "Stuck for a gift? Give a prepaid credit card", www.bankrate.com, Dec. 21, 1998, printed Apr. 6, 1999 at 10:45 AM; 4 pages.

AT&T Marketing, "Universal card free lifetime membership extended 3 months", www.att.com/press/0297/970217.csa.html, Dec. 4, 1990, News Release, For Release Tuesday, Dec. 4, 1990; printed Jun. 24, 1999 printed 8:45 AM; 4 pages.

"Welcome to Swiftgift", Swiftgift, www.swiftgiftcard.com, Dec. 8, 1998.

Antoinette Coulton, "Incentives field moving to card-based series 14", American Banker, Mar. 26, 1998.

Business Travel News, "Maritz gets mastercard's stamp of approval", Aug. 19, 1996.

First USA Platinum Connect, First USA Bank, First USA Promotional Mailing, Oct. 1997.

Introducing the First USA Platinum Connect Card, First USA Promotional Mailing, Dec. 1997.

Phil Britt, Competing in Auto Lending, America's Community Banker, vol. 5, No. 11, pp. 33-37, Nov. 1, 1996.

Miriam Krenin Souccar, Smart Cards: 1st Union Smart Card Pilot Enlists a Second Army Base, American Banker.

First Union Issues Smart Cards to Fort Benning Recruits, CardFax.

Emerson Brown and Jim Baum, Purchasing Card Magic: Eli Lilly Finds Accounts Payable Flying High With Plastic, Corporate Cashflow.

Christine Dugas, Payroll May Ask: Paper or Plastic?, USA Today, 3B, Aug. 14, 2001.

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks For ID, Time Magazine, Apr. 12, 2004, 1 page.

A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issues/issue7_3/claessens, retrieved from the internet on Oct. 6, 2006.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

American Express Incentive Services, Incentive, Sep. 1996, p. 126.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

Associates First Capital Corporation, Hoover's Inc., The Industry Standard: The Newsmagazine of the Internet Economy, thestandard.net/companies/company-display, Apr. 6, 1999.

Award Card Comparison, JA7922.

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatman's Floats Stored Value into the Employee Incentive Waters, Debit Card News, vol. 2, Issue 2, Jul. 16, 1996, 3 pages.

CES/NaBANCO introduces stored value card technology blockbuster video is first merchant partner, Business Wire, Inc., Jan. 15, 1996.

Card Based Award Systems, JA8309.

CardEx Incentives, www.cardex.com, Apr. 6, 1999.

CardFlash, Apr. 5, 2005.

Vandenengel, Cards on the Internet: Advertising on a $3 Bill, Industry Intelligence, Feb. 2, 1995, pp. 46-48.

Kutler, Cash Card Creator Looking Beyond Mondex, Feb. 9, 1995.

Rosen, Cash Just Isn't Flexible Enough: Shops of the Future Will Only Take Cards, Daily Express, Technology Section, Feb. 10, 1995, 1 page.

Bank, Cash, Check,Charge—What's Next?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environmental risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.

Consortium created to manage common electronic purse specification, Cardtech Securtech, Chicago, www.visa.com/av/news/PRmisc051199.vhtml, May 11, 1999.

Nora Wood, Corporate Spotlight, Incentive, Dec. 1997, 4 pages.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying By Credit Card-Real World and Online, http://www.virtualschool.edu/mon/ElectronicProperty/klamond/credit, printed Jul. 8, 2005, 17 pages.

D.C. Area Safeway Stores Look for Increase in Sales Volume and Revenue with Cards, Card News, vol. 6, No. 25, Dec. 30, 1991, pp. 7-9.

Piskora, Debit Cards Seen Poised for New Markets, American Banker, Credit/Debit/ATMs, Mar. 7, 1995, p. 16.

Definition of Store-Value Card, Wikipedia, retrieved from the internet at http://en.wikipedia.org/wiki/Stored-value_card, retrieved from the internet on Apr. 16, 2007.

E-Z Pass, Web page, http://www.ezpass.com-Disc_portNewYork.html, Nov. 12, 2001.

E-Z Pass, Web page, http:\\www.ezpass.com-Disc_ny_annual.html, Nov. 12, 2001.

E-Z Pass, Web page, http:\\www.ezpass.com-frameMain.html, Nov. 12, 2001.

E-Z Pass, Web page, http:\\www.ezpass.com-whatis.html, Nov. 12, 2001.

Eight Keys to Making the Right Choice, Incentive, Dec. 1996, 9 pages.

D. O'Mahony , Electronic Payment System, 1997, Artech House, XP002137255, p. 7-11.

Business Times, Electronic Purse Can Free You from ATM Drag, Business Times, www.btimes.co.za, printed Feb. 23, 2001, 1 page.

Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

Exclusively Yours From Maritz . . . The MasterCard Card Ultimate Incentive, Incentive, Oct. 1995, 3 pages.

Block, First Data Subsidiary Creates Payroll Card for the Bankless, LexisNexis Academic, Credit/Debit/ATMs, p. 10, Mar. 21, 1997.

First Data markets stored-value cards, Cards International, Jan. 30, 1996, p. 5.

First USA—Activate Today and Get One Hour Free Calling Cards, Call 1-800-555-2535, First USA, 6 pages.

First USA—Call 1(800)335-2453 To Receive One Free Hour of Domestic Long Distance Calling (No Strings Attached), First USA, 6 pages.

First USA Platinum Connect, First USA Bank, First USA Promotional Mailing, Oct. 1997, 6 pages.

First Union Issues Smart Cards to Fort Benning Recruits, CardFax, vol. 1999, No. 60, Mar. 26, 1999, 1 page.

Norris, First Data unit develops blockbuster cash card, Omaha World Hearld Sunrise Edition, Business Section, Jan. 19, 1996, p. 16.

Frequently asked questions, ECARD, www.eregard.com, printed Sep. 23, 2001, 7 pages.

Glossman, et al.,, Glossman, et al., Citicorp Company Report, Report No. 1647151, p. 8 of 16.

Machlis, Have it the smart way: Burger King program drives smart-card use, Computerworld, printed Feb. 23, 2001, 1 page.

Here's the calling convenience you asked for: 1-800-call-ATT . . . For All Calls, AT&T, Appendix A: For Card Carriers, 1999, 7 pages.

Hoovers, General Mills, Inc. Corporate Profile relied upon to show the history of the company, http://cobrands.hoovers.com/global/cobrands/proquest/history.xhtml?COID=10639, Jul. 12, 2005, 2 pages.

How Is It Different?, JA8331.

Konrad, IBM Had a Bunch of Unusual Ideas in 2003, www.philly.com, printed Jan. 21, 2004, posted on Jan. 13, 2004, 2 pages.

Incenticard, Bellsouth, JA8329.

Meridian-the leader in card marketing, JA8343.

Meridicard vs. Debit Cards, JA7917.

Clark, Microsoft, Visa to Jointly Develop PC Electronic-Shopping Software, The Wall Street Journal, Nov. 9, 1994, WSJ B9.

More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Schwab, Charles, Now 7 Ways For A better Total Return For Your Money; Schwat 1, The Inventor's Asset Management Account, Charles R. Schwab, Charles Schwab & Co., Inc., 16 pages.

Allen et al., Overview of Smart Cards and the Industry, Smart Cards: Seizing Strategic Business Opportunities, Chapter 1, p. 2-20, Irwin Professional Publishing, 1997.

Paper of Plastic? With these three incentives, The Choice is Yours, Incentive, Feb. 1996, 2 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Judy Quinn, Incentive Cards Explained, Incentive, Dec. 1995, 5 pages.

Incentive Firms Find Debit Cards A Rewarding Experience (Off-line debit card issuers converge efforts with companies looking for effective incentives to boost employee productivity and to motivate individuals to buy their products), Debit Card News, Vol.

Vincent Alonzo, Incentive Marketing . . . Three If By Smart Card, Incentive Sep. 1995, p. 11.

Incentive gift Card: Another way to give the gift of choice!, Incentive, Aug. 1995, 2 pages.

Coulton, Incentives Field Moving to Card-Based Series 14, American Banker, Mar. 26, 1998, 3 pages.

Introducing SpendingMoney(TM), Armetta: Marketing & Design Product Concept Report, Oct. 9, 1996, 15 pages.

Introducing the First USA Platinum Connect Card, First USA Promotional Mailing, Dec. 1997, 2 pages.

Key Bank Holiday Offer, http://www.key.com/swiftgift/home.html, printed Apr. 5, 1999.

LexisNexis Academic, Debit Card Innovation, vol. XXXV, No. 5, p. 2, May 1997.

LexisNexis Academic, Debit Cards: Payroll Card Ups Fees, Future Banker, p. 18, Oct. 6, 1997.

LexisNexis Academic, NTS' Transpay Debit Card Helps Remote and Unbanked Employees Get Funds Quicker, Financial News, Mar. 18, 1997.

MailFrontier Survey Finds that Consumers Hold Financial Institutions Accountable for Online Identity Theft, www.mailfrontier.com, Palo Alto, CA, Nov. 2004.

O'Conner, Maritz Gets MasterCard's Stamp of Approval, Business Travel News, Aug. 19, 1996, 2 pages.

Maritz, Incentive, Jun. 1996, p. 111.

Meridian Award Cards, JA8251.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p. 1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

The Federal Transit Administration, TCRP Report 32 Multipurpose Transit Payment Media, Chapter 2 Multipurpose Fare Payment: Overview, p. 10-20.

Stoughton, The Gift of Credit, www.washingtonpost.com/wp-srv/business, Dec. 14, 1998.

Nora Wood, The Power of the Card, Incentive, Jul. 1997, 6 pages.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.ici.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based On CEPS, www.visa.com/av/news/praaamisc111699.vhtml, Nov. 16, 1999.

Visa first to launch electronic purse load via GSM mobile phone, www.cellular.co/za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Welcome To Card Express CardEx, CardEx website archived by web.archive on Oct. 31, 1996, http://web.archive.org/web/*/http://www.cardex.com, retrieve Oct. 18, 2003, 7 pages.

Welcome To Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

SWIFTGIFT, Welcome to Swiftgift, www.swiftgiftcard.com, Dec. 8, 1998, 10 pages.

Kenneth Hein, What's the Deal?, Incentive, Jul. 1998, 7 pages.

* cited by examiner

SELECTABLE MULTI-PURPOSE CARD

This application is a continuation application of U.S. Ser. No. 11/011,683, filed Dec. 15, 2004 and now issued as U.S. Pat. No. 7,191,952, which was a divisional of U.S. Ser. No. 10/436,466, filed May 13, 2003 and now issued as U.S. Pat. No. 7,163,153, which was a divisional of U.S. Ser. No. 09/730,399, filed Dec. 6, 2000 and now issued as U.S. Pat. No. 6,631,849, each of which are hereby incorporated by reference in their entireties.

FIELD OF THE INVENTION

The present invention relates generally to a financial services vehicle, such as plastic credit cards of the type commonly associated with MASTERCARD®, VISA®, AMERICAN EXPRESS®, ATM banking cards, security cards, or identification cards. More specifically, it relates to a selectable, multi-purpose card having a plurality of features stored in memory means operatively mounted on the card and selection means mounted on the card or a card reader allowing a user to select a card feature in a single step. The features when selected allow the card to function as a different card and/or to perform functions not traditionally available in financial plastic cards.

BACKGROUND OF THE INVENTION

Magnetic cards, such as commercial credit cards, debit cards, or transfer funds cards are widely used for payments, cash advances, or other financial transactions. Data for identifying the customer, such as an account number, a security code, or other identifying data is typically magnetically stored on a magnetic tape or strip embedded into the back side of the card.

When a transaction is to be performed at a retail store, a customer hands his or her card to an employee of the retail store and the employee then scans the magnetic information into a communication device.

When a credit card is utilized in a bank in order to receive a cash advance, the transaction is handled by either a teller or an automated teller machine (ATM). In the case of an ATM, the card is placed inside the ATM and the credit card owner enters a personal identification number (PIN) which is transmitted to the credit card company along with the transaction information. When the PIN number is found to be incorrect, most credit companies send to the credit card user a request to re-enter the PIN number.

Smart cards, i.e., cards having integrated circuit (IC) chips embedded into the cards are also known. A conventional smart card may include a processor coupled to an electrically erasable, programmable, read-only memory (EEPROM), read-only memory (ROM) and random access memory (RAM). These components may be fabricated onto a single integrated chip comprising a microprocessing/controller unit (MPU). The processor executes instructions stored on ROM and temporarily stores data on RAM whereas the EEPROM is a non-volatile memory used for storing data identifying the uniqueness of a smart card. A smart card also may include an input/output (I/O) signal interface for transferring various I/O signals between the smart card and an external system. The I/O interface may take the form of a contact with the external system, or a peripheral thereof, for proper transfer of signals. Alternatively, the I/O interface may take the form of a radio frequency (RF) interface for allowing communication between the smart card and the external system via the transmission and reception of RF signals. The external system may take the form, for example, of a card reader, a merchant's point of sale system, or an automated teller machine.

Typically, power is supplied to the smart card from the external system when the system communicates with the smart card. This may be accomplished through the I/O interface. However, this means that a smart card is only powered and its data is accessible only when the smart card is connected to the external system.

One of the widespread uses of smart card technology is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is eliminating the need for people to carry around small coins or bills and speed up the time it takes to consummate small cash transactions. However, most chip cards do not offer built-in displays for viewing the cash balance remaining on the chip card. This reduces the convenience and ease of use of chip cards.

Some have suggested including a display to a plastic card in conjunction with input means, such as a keypad for viewing and editing information. For example, U.S. Pat. No. 4,954,985 to Yamazaki describes a smart card with a ferroelectric, liquid crystal memory region and a ferroelectric, liquid crystal display (LCD) region. U.S. Pat. No. 5,777,903 to Poisenka, et al. describes a smart card having a microprocessing unit (MPU) for executing instructions stored in a memory, a liquid crystal display (LCD), coupled to the MPU for displaying information, a keypad, coupled to the MPU and to the display for entering data by the user, an interface for transferring signals between the smart card and the external system when the smart card is coupled to the external system, and photovoltaic cells for providing power to the smart when the smart card is exposed to light.

U.S. Pat. No. 5,590,038 to Pitroda ("Pitroda") describes a card that includes an LCD display and means for selecting between various card features. The means for selecting between the various card features, described by Pitroda, are generally complex, difficult to implement and they will result in a bulky and unpractical plastic card. Moreover, LCDs such as the one suggested by Pitroda have not found wide commercial success in plastic cards. They are generally less flexible than the remainder of the plastic cards, and thus, they tend to fracture under normal use conditions. To prevent LCDs from fracturing the displays would have to be either too small or too thick. Another problem associated with multi-purpose cards, such as the card of Pitroda is that they generally require the user to follow a plurality of steps to select the desired feature. These and other problems with known plastic cards exist.

SUMMARY OF THE INVENTION

It is an object of the present invention to provide a thin, flexible, card that combines the functions of different cards into a single card instrument.

It is another object of the present invention to provide a card that includes a plurality of features and selection means that allow a user to select a desired feature preferably in a single step, prior to presenting the card to a sales person or using the card.

It is yet another object of the present invention to provide a card that may include a thin, flexible display, such as a light-emitting polymer (LEP) display for displaying information denoting the selected feature, and/or other information, or instructions relating to the selected feature. The information may be, for example, account status or recent transaction information or a graphic image such as a logo of the issuing authority.

One aspect of the present invention relates to a selectable, multi-purpose card that includes a plurality of features stored in memory means operatively mounted on the card and selection means mounted on the card for allowing a user to select a feature in only a few simple steps or preferably in a single step. In an alternative embodiment the selection means are mounted on a card reader device. The card reader may also include a display for displaying information relating to the various card features.

Preferably, the card is a thin, flexible card having substantially the same form factor as conventional plastic credit or smart cards of the type commonly associated with MASTERCARD®, VISA®, and AMERICAN EXPRESS®. Preferably, the card may be from about 80 mm to about 90 mm long, from about 50 mm to about 60 mm wide and from about 0.5 to about 1.5 mm thick.

The card can be, for example, a debit card, a credit card, a transfer funds card, a smart card, a stored-value card, a gift card, an ATM card, a security card or an identification card. The features may allow the card to function as a different card, such as a credit card, debit card, ATM bank card, stored value card, security card, identity card and the like. The card may also include means for providing or processing either account, identity, payment, health, transactional, or other information and communicating with central processing units or computers operated by the providers of services, such as credit card institutions, banks, health care providers, universities, retailers, wholesalers or other providers of goods or services employers, or membership organizations. Card features may also enable the card to communicate with or be accessed by other devices, including those used by retailers (point of sale computers), and personal computers used in other business applications or at home, for example, personal computer using a built-in or attached card reader.

A card feature may be selected by a variety of means, such as by input at the merchant point of sale, on the Internet, network, or similar virtual location, through an associated input device, or preferably by means included on the plastic card itself.

In one embodiment of the present invention, a card is provided which includes a plurality of magnetic strips, each magnetic strip containing information that allows activation of a different card feature. Preferably, the magnetic strips are positioned on the card in a manner that allows them to be read by simply swiping them in a conventional magnetic reading device such as an ATM machine or any other magnetic strip reader. However, in alternate embodiments, swiping may require a particular orientation of the card, and/or a particular depth setting of the magnetic stripe reader in order to access the appropriate feature, account, identity or other information stored on the card.

In another embodiment of the present invention a card is provided which includes a programmable magnetic strip, a plurality of features stored in memory means mounted on the card, a plurality of buttons or contacts for selecting between the features, and means for programming the magnetic strip with a different card feature. The user can select a feature by depressing or touching the buttons and or contacts which causes the programming means to program the magnetic strip with information that activates the selected feature. The user can then scan the card in a magnetic reader device. Preferably, the card of the present invention may contain a display for displaying information denoting the selected feature, or other information and instructions relating to the selected feature. More preferably, the display may be a light-emitting polymer (LEP) display. Alternatively, a card reader may be provided comprising selection means and a display for selecting and displaying a card feature.

In yet another embodiment of the present invention, a card is provided that includes a display, preferably an LEP display, and a keypad for selecting a different card feature and/or editing information relating to the selected feature. Suitable light emitting polymeric materials include conjugated polymers such as poly (p-phenylene vinylene) (PPV), PPV derivatives, pyridine containing polymers and copolymers such as poly (p-pyridine) (PPy), poly (p-pyridyl vinylene) (PPyV), copolymers of PPyV and PPV derivatives $(PPyVP(R)_2V)$ with various functional side groups $R=C_{12}H_{25}$, $OC_{16}H_{33}$, $COOC_{12}H_{25}$, strapped copolymer, and other conjugated polymers and copolymers.

Means also may be provided for providing storing, and recharging electric power and for selectively providing power to the components to the card. The card may also include security means for preventing unauthorized use of the card and for preventing unauthorized access to the information stored in the memory means of the card.

The present invention also relates to a method for conducting an electronic transaction comprising providing a selectable multi-purpose card and a card reader; establishing an electronic communication between the card and the card reader, selecting a card feature, and conducting an electronic transaction corresponding to the selected card feature.

Other features and advantages of the invention will become apparent from the description of preferred embodiments in conjunction with the following figures.

DETAILED DESCRIPTION OF THE PREFERRED EMBODIMENTS

Figure 1:
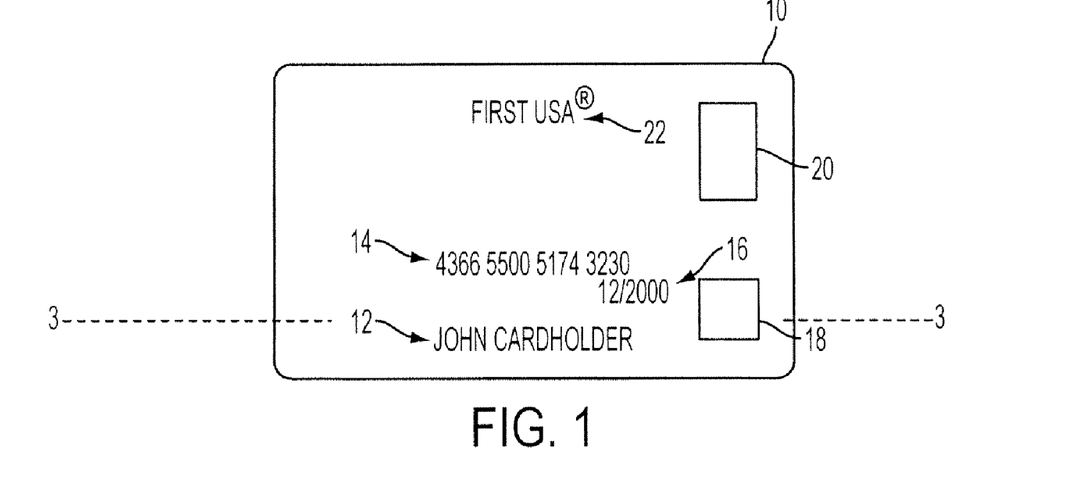
FIG. 1 is a front view of a card according to one embodiment of the present invention.
Figure 2:
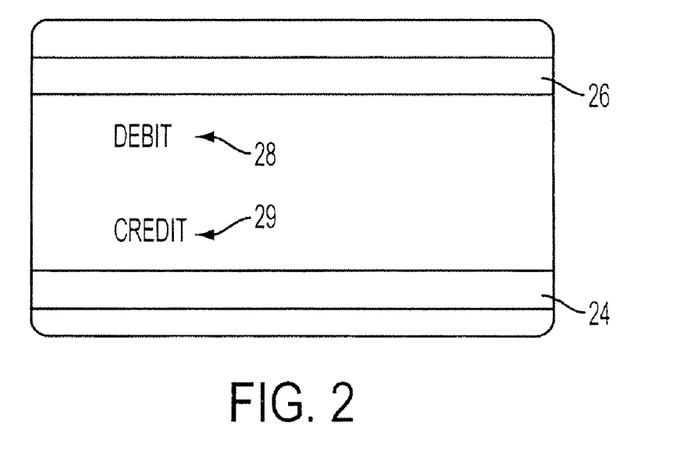
FIG. 2 is a rear view of the card of FIG. 1.

Referring to FIGS. 1 and 2, a preferred embodiment of the present invention card is provided. The front face of the card 10 has embossed letters 12 which identify the authorized user of the card 10. It further includes embossed account numbers 14 which identify the account associated with the card 10. For example, if the card is used as a credit card the account number 14 identifies the credit account from which charges are deducted when a purchase or cash advance is made.

The front face of the card 10 further may also include numbers 16 denoting the expiration date of the card, a logo 18 denoting the issuing authority such as VISA®, MASTERCARD®, AMERICAN EXPRESS®. The front face of the card 10 may further include one or more conventional design elements such as a hologram 20, and printed letters 22 denoting the financial institution issuing the card.

The rear face of the card 10 includes two magnetic strips 24 and 26. Each magnetic strip 24 is programmed with a code corresponding to a particular feature of the card and an authorization code. Embossed or printed characters 28, 29 positioned adjacent the magnetic strips 26, 24, respectively, denote the card feature that can be activated by swiping each magnetic strip. Magnetic strips 24 and 26 can be read using conventional magnetic reader devices. Magnetic strips 24 and 26 are preferably positioned in a manner that allows selection of a desired feature by simply swiping magnetic strip with the desired feature through a conventional magnetic reader device such as an ATM machine. Card 10 has width, length, and thickness dimensions similar to those of conventional plastic cards. For example, a card 10 may be about 86 mm long, about 55 mm wide, about 0.8 mm thick, and may meet other ISO Standards associated with such cards.

Figure 3A:
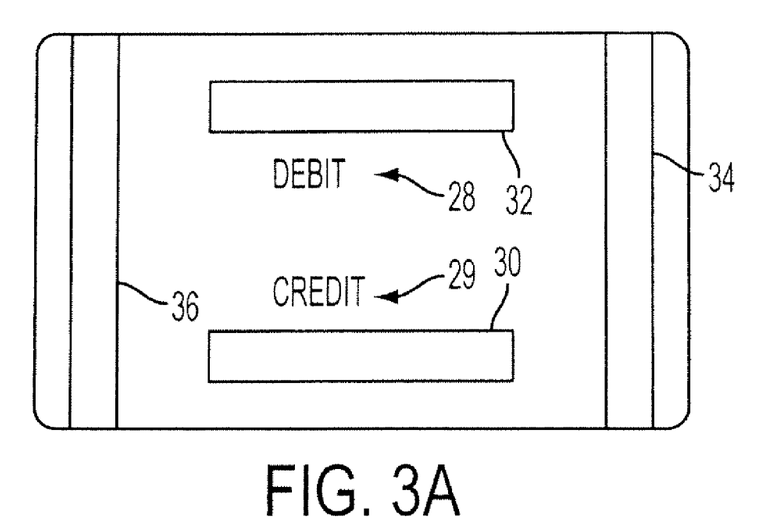
FIG. 3A is a rear view of a card according to another embodiment of the present invention.

FIG. 3A illustrates an alternative embodiment where card 10 has four magnetic strips 30, 32, 34, and 36 embedded on the rear face of card 10, which are preferably positioned sufficiently close to the edges of the card 10 to permit scanning by simply swiping conventional magnetic reader devices. However, it should be understood that the present invention is not limited to the aforementioned configuration and positioning of the magnetic strips, and that other embodiments can be envisioned by a person skilled in the art from the disclosure of the present invention. For example, the magnetic strips may be on the front or the rear face of the card.

Figure 3B:
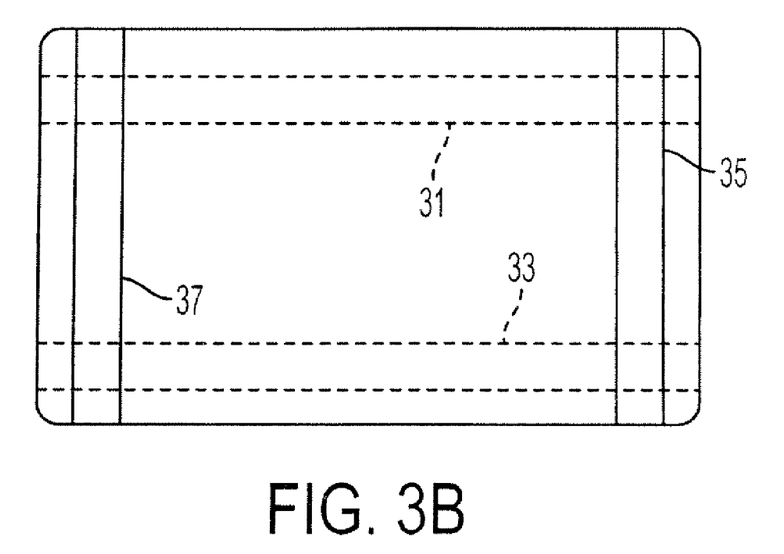
FIG. 3B is a rear view of a card according to another embodiment of the present invention.

FIG. 3B illustrates an embodiment of the present invention wherein a card has vertical magnetic strips 35 and 37 positioned on the rear face of the card and horizontal magnetic strips 31 and 33 positioned on the front face of the card. The length and width of the magnetic strips may vary. For example, the horizontal magnetic strips 31 and 33 may extend the whole length of the front face of the card as shown in FIG. 3B.

Figure 4:
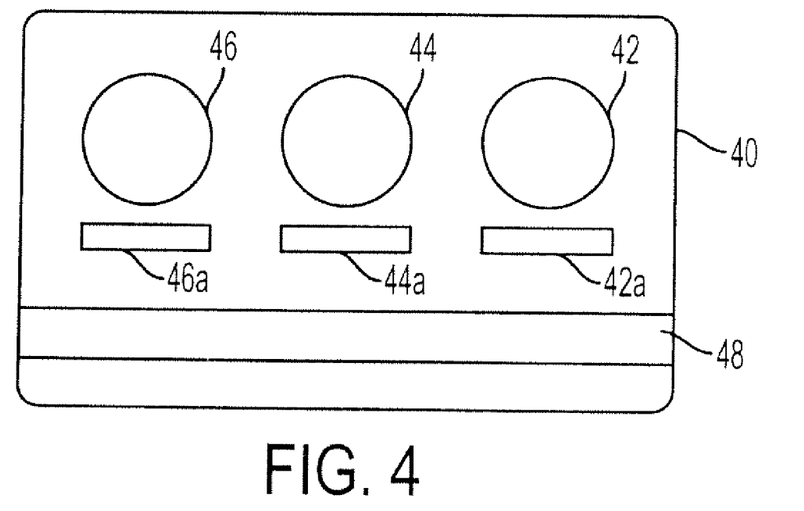
FIG. 4 is a rear view of a card according to yet another embodiment of the present invention.
Figure 5:
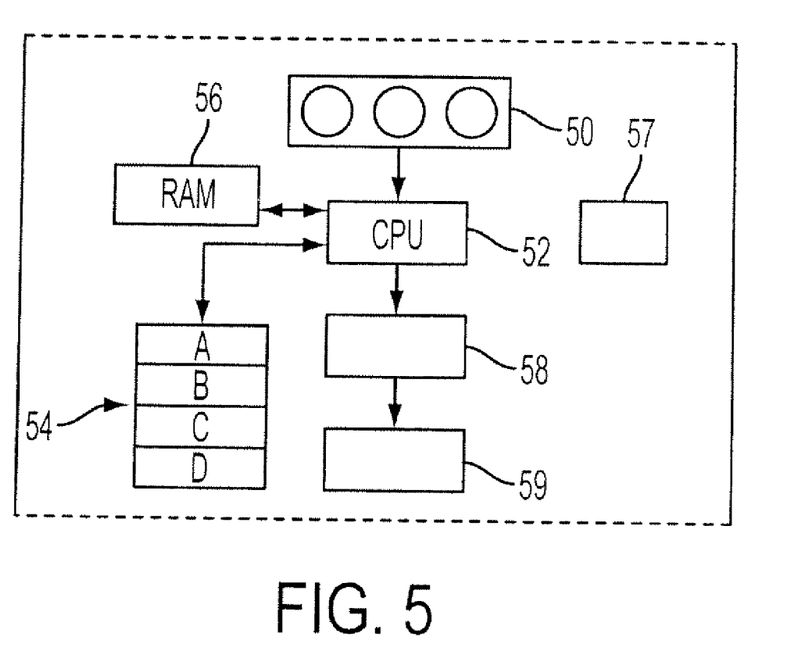
FIG. 5 is a block schematic of exemplary systems and circuits that may be employed in the card of FIG. 4.

Referring to FIGS. 4 and 5 another embodiment of the present invention is provided. FIG. 4 illustrates the rear face of a smart card 40 having a plurality of buttons 42, 44, and 46, each button activating a different card feature. For example, buttons 42, 44, and 46 may be depressible or touch sensitive buttons. Optionally, the rear face of the smart card 40 may further include characters 42a, 44a, and 46a denoting the card feature corresponding to each button 42, 44 and 46, respectively. The back face of the smart card 40 may also include a programmable magnetic strip 48. The magnetic strip is encoded with a code number or some other key corresponding to a card feature selected by the user by depressing or touching a button corresponding to that feature. To accomplish this the smart card 40 may, for example, include the systems and circuits illustrated in FIG. 5. Referring now to FIG. 5, card 40 includes a central processing unit (CPU) 52, a read-only memory (ROM) 54, dynamic memory (RAM) 56, a power supply system 57, an input control circuit 50, a magnetic strip controller 58 and an inductor 59. The power supply system 57 may be any of many well known systems such as, for example, a solar cell connected to a rechargeable battery. In operation, the CPU 52 receives power from the power supply system 57 and distributes the power to the other systems and circuits by a programmed sequence of steps which is stored in the ROM 54.

The smart card 40 may also include a display (not shown). For example, after a selection of a feature is made, a graphic image may appear on the display which looks like the face of a conventional credit card, including the account number, the user's name, the name of the credit card company and its logo. Thereafter, the user may present the card to the point of sales terminal for a sales transaction. The display is preferably a thin, flexible LEP display.

Memory 54 may be divided into a plurality of discrete portions, i.e., a common portion A containing information such as the identity of the user and a basic account number and individual discreet portions B, C and D. Each discrete portion B, C, D may contain at least a code or some other key that allows access to a specific card feature. In operation, the user may select a card feature by depressing one of the buttons 42, 44 or 46. The button controller circuit 50 is operatively connected to the CPU 52. The button controller circuit 50 detects which button is depressed and sends this information to the CPU 52. The CPU 52, in turn, uses this information to read the code and any other information stored in a discreet portion of memory 54 that corresponds to the button depressed by the user. The CPU 52 also may read the user information stored in the common portion A of memory 54, and store the code and user information in the RAM 56.

The magnetic strip 48 is then encoded with the code, user and any other information stored in the RAM 56. This encoding may be achieved by many different methods known in the art such as the one described, for example, in U.S. Pat. No. 4,868,376 to Lessin et al. which is incorporated herein by reference for all purposes to the extent that is not inconsistent with the disclosure and claims of the present invention.

For example, data to be communicated may be output from a processor and converted by magnetic strip control circuit 58. Magnetic strip control circuit 58 may output a signal that drives an inductor 59 to generate a magnetic field pattern which can be read by a card reading device. Signals representing the data to be communicated are output serially, thus emulating data encoded on a magnetic strip.

Preferably, the data is only temporarily preserved on the magnetic strip 48. After a certain predetermined period of time sufficient for completion of the transaction, for example, five minutes, the processor may supply a signal to the magnetic strip control circuit which eliminates the generation of the magnetic field, thereby decoding or erasing the magnetic strip.

In a variation of the above embodiment, instead of, or in addition to the buttons 42, 44, and 46, the plastic card may contain at least one pair of contacts which are exposed on at least one surface of the card. The contacts are designed to allow a user of the card to select a feature corresponding to the pair of contacts by bridging the exposed contacts with his finger.

In an alternative embodiment of the present invention a smart card is provided comprising a plurality of features stored in a plurality of chips operatively mounted on the card and a plurality of contact interfaces corresponding to each chip. The contact interfaces may be mounted on the front or rear face of the card for allowing a user to select a card feature separately using a smart card reader to activate a card feature via a contact interface. The contact interfaces are preferably positioned on the card to allow scanning or reading using conventional smart card readers.

In yet another embodiment, the card may include a thin, flexible, LEP display. The LEP display may cover, for example, a portion of the surface of the card or it may cover the whole surface of at least one side of the card. By selecting a feature of the card as described above, information denoting the selected feature, other information and/or instructions relating to the selected feature may appear on the display. The information may, for example, be an image, characters, numbers or any combination thereof denoting the credit card issuing authority, the credit card company and its logo. The display may be touch-sensitive, e.g., it may provide the user with a number of graphical images which enable the user to selectively chose a card feature by touching selected parts of the touch-sensitive display.

For example, a user may select a feature of the card, such as a stored-value feature. The LEP display, mounted preferably on the front side of the card (not shown), will then display the characters "STORED-VALUE" and the remaining amount in the stored value card.

In one embodiment the LEP display may comprise a semiconductor layer in the form of a thin dense polymer film comprising at least one conjugated polymer, a first electrode in contact with a first surface of the semiconductor layer and a second electrode in contact with a second surface of the semiconductor layer. The polymer film should have a sufficiently low concentration of extrinsic charge carriers so that on applying an electric potential between the first and second electrodes in a manner that renders the second electrode positive relative to the first contact layer charge carriers are injected into the semiconductor layer and light is emitted from the semiconductor layer.

In yet another embodiment, the LEP display comprises an electron transporting layer in contact with an electron blocking polymer, the electron blocking polymer incorporating a network electrode polymer. The LEP display is connected to a source of electrical current via electrodes so as to supply the electron transporting polymer with a flow of electrons, and to cause an electroluminescent emission from the heterojunction between the electron transporting polymer and the electron blocking polymer.

The electron transporting polymer may be any conductive polymeric material of appropriate conductive and electron affinity characteristics to allow it to act as the electron transporting polymer in a light emitting device. Likewise, the electron blocking polymer may be any polymeric material of appropriate electron blocking-polymer characteristics to allow it act as the electron blocking polymer in a light emitting device. The network electrode polymer may be any polymeric material that forms an electrically conducting network polymeric structure within the electron blocking polymer.

Figure 6:
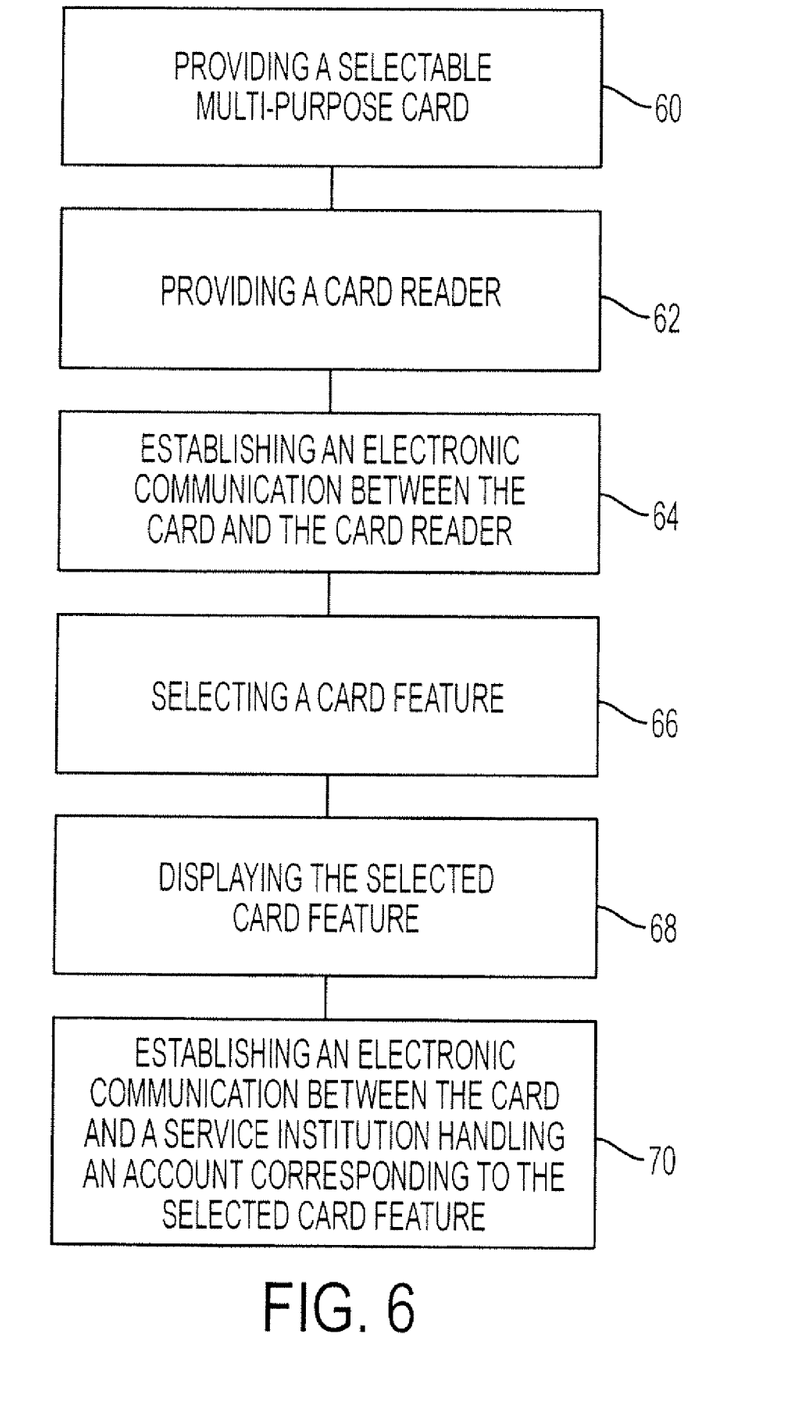
FIG. 6 is a block schematic of a preferred embodiment of the present invention method.

Referring to FIG. 6 a method for conducting an electronic transaction using the selectable multi-purpose card of the present invention is provided. The method comprises providing a selectable multi-purpose card and a card reader, according to blocks 60 and 62, respectively. The card reader may be any conventional reader having means for establishing an electronic communication between the card reader and the card, and means for establishing an electronic communication between the card and a service institution handling an account corresponding to the selected card feature. Preferably, the card reader may also include means for allowing a user to select a card feature and a display for displaying the selected card feature and/or other information relating to the selected card feature.

The method further comprises establishing an electronic communication between the card and the card reader, and selecting a card feature according to blocks 64 and 66, respectively. The selected feature may then be displayed on a display mounted either on the card or the card reader, according to block 68. The method further comprises establishing an electronic communication between the card and a service institution handling an account corresponding to the selected feature, according to block 70.

The foregoing embodiments have been presented for the purpose of illustration and description only and are not to be construed as limiting the scope of the invention in any way. The scope of the invention is to be determined from the claims appended hereto.

What is claimed is:

1. A method for conducting an electronic transaction comprising:
   providing a selectable multi-purpose device having a plurality of features stored in memory operatively mounted on the device allowing the device to function as multiple accounts;
   providing a display operatively mounted on the device wherein the display is configured to show an account status;
   providing a user interface for allowing a user to select a device feature in a single step; selecting a device feature;
   providing a radio frequency (RF) interface for allowing communication between the device and an external system via transmission and reception of RF signals; and
   establishing an electronic communication between the device and device interface.

2. The method of claim 1, wherein the display provides information relating to the device features.

3. The method of claim 1, wherein the display provides information relating to the selected device feature.

4. The method of claim 1, wherein the display is configured to show an account balance.

5. The method of claim 1, wherein the display is configured to show a remaining value in an account.

6. The method of claim 1, wherein the display is configured to show a remaining value stored on the device.

7. The method of claim 1, wherein the display is capable of displaying a graphic logo.

8. The method of claim 1, further comprising the step of establishing an electronic communication between the device and a service institution handling at least one account corresponding to the selected feature.

9. The method of claim 1 wherein the user interface comprises a plurality of buttons.

10. The method of claim 1 wherein the user interface comprises a plurality of contacts.

11. The method of claim 1 wherein the user interface comprises a touch sensitive display.

12. The method of claim 1 wherein one or more of the device features comprises debit account functionality.

13. The method of claim 1 wherein one or more of the device features comprises credit account functionality.

14. The method of claim 1 wherein one or more of the device features comprises transfer funds account functionality.

15. The method of claim 1 wherein one or more of the device features comprises smart card functionality.

16. The method of claim 1 wherein one or more of the device features comprises stored-value account functionality.

17. The method of claim 1 wherein one or more of the device features comprises gift account functionality.

18. The method of claim 1 wherein one or more of the device features comprises ATM account functionality.

19. The method of claim 1 wherein one or more of the device features comprises security verification functionality.

20. The method of claim 1 wherein one or more of the device features comprises identification functionality.

21. A method for conducting an electronic transaction comprising:
  providing a selectable multi-purpose device having a plurality of features stored in memory means operatively mounted on the device allowing the device to function as multiple accounts;
  providing a radio frequency (RF) interface for allowing communication between the device and an external system via transmission and reception of RF signals;
  providing a selection means on the external system for allowing a user to select a device feature in a single step;
  providing a display on the external system wherein the display is configured to show an account status;
  establishing an electronic communication between the device and the external system; and selecting a device feature.

22. The method of claim 21 wherein one or more of the device features comprises debit account functionality.

23. The method of claim 21 wherein one or more of the device features comprises credit account functionality.

24. The method of claim 21 wherein one or more of the device features comprises smart card functionality.

25. The method of claim 21 wherein the external system the device communicates with is an ATM machine.

26. A method for conducting an electronic transaction comprising:
  providing a selectable multi-purpose device having a plurality of features stored in memory operatively mounted on the device allowing the device to function as multiple accounts;
  providing a display operatively mounted on the device wherein the display is configured to show a remaining value;
  providing a user interface for allowing a user to select a device feature in a single step;
  selecting a device feature;
  providing a radio frequency (RF) interface for allowing communication between the device and an external system via transmission and reception of RF signals; and
  establishing an electronic communication between the device and device interface.

* * * * *